United States Patent
Akasaka (10) Patent No.: US 12,463,396 B2
(45) Date of Patent: Nov. 4, 2025

(54) RAMAN OPTICAL AMPLIFIER WITH FABRY-PEROT PUMP LASER

(71) Applicant: FUJITSU LIMITED, Kawasaki (JP)

(72) Inventor: Youichi Akasaka, Plano, TX (US)

(73) Assignee: FUJITSU LIMITED, Kawasaki (JP)

( * ) Notice: Subject to any disclaimer, the term of this patent is extended or adjusted under 35 U.S.C. 154(b) by 1071 days.

(21) Appl. No.: 17/491,476

(22) Filed: Sep. 30, 2021

(65) Prior Publication Data
US 2023/0102535 A1    Mar. 30, 2023

(51) Int. Cl.
| | |
|---|---|
| H01S 3/094 | (2006.01) |
| H01S 3/067 | (2006.01) |
| H01S 3/0941 | (2006.01) |
| H01S 3/10 | (2006.01) |
| H01S 3/30 | (2006.01) |

(52) U.S. Cl.
CPC .... H01S 3/094046 (2013.01); H01S 3/06754 (2013.01); H01S 3/09415 (2013.01); H01S 3/1003 (2013.01); H01S 3/302 (2013.01); H01S 2301/04 (2013.01)

(58) Field of Classification Search
None
See application file for complete search history.

(56) References Cited

U.S. PATENT DOCUMENTS

| | | | | |
|---|---|---|---|---|
| 6,111,688 A | * | 8/2000 | Kobayashi | H01S 3/094003 359/337.13 |
| 6,292,288 B1 | * | 9/2001 | Akasaka | H01S 3/13013 372/71 |
| 6,525,870 B1 | * | 2/2003 | Cho | H01S 3/302 359/334 |
| 2003/0137720 A1 | * | 7/2003 | Onaka | H01S 3/13013 359/334 |
| 2005/0225846 A1 | * | 10/2005 | Nati | H01S 3/06779 359/341.1 |
| 2008/0049303 A1 | * | 2/2008 | Nakata | H01S 3/302 359/334 |
| 2016/0142148 A1 | * | 5/2016 | Marpaung | H01S 3/0078 398/183 |

* cited by examiner

Primary Examiner — Eric L Bolda
(74) Attorney, Agent, or Firm — Maschoff Brennan (57) ABSTRACT

A fixed input current is provided to a pump laser of an optical pumping block. Further, a first tuning temperature is provided to the pump laser while providing the fixed input current. The first tuning temperature is based on a target band of a pumping beam and causes the pump laser to generate a light beam having a first frequency band that is dictated by the first tuning temperature and the fixed input current. Further, a second tuning temperature is provided to a temperature dependent optical reflector configured to receive the light beam. The second tuning temperature is based on the target band of the pumping beam and causes the optical reflector to reflect light of the light beam that is within a second frequency band that corresponds to the target frequency band. The reflected light beam is emitted into a transmission optical medium configured to carry an optical signal.

20 Claims, 4 Drawing Sheets

RAMAN OPTICAL AMPLIFIER WITH FABRY-PEROT PUMP LASER

FIELD

The embodiments discussed herein are related to dual polarization optical pumping.

BACKGROUND

Telecommunications systems, cable television systems and data communication networks use optical networks to convey information between remote points. In an optical network, information is conveyed in the form of optical signals through optical fibers or other optical media. The optical networks may include various components such as amplifiers, dispersion compensators, multiplexer/demultiplexer filters, wavelength selective switches, couplers, etc. configured to perform various operations within the optical network. Further, optical pumping may be used to amplify optical signals that propagate through optical networks.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a fixed input current is provided to a temperature and current dependent pump laser of an optical pumping block. Further, a first tuning temperature is provided to the pump laser while providing the fixed input current. The first tuning temperature is based on a target band of a pumping beam and causes the pump laser to generate a light beam having a first frequency band that includes a first center frequency and a first bandwidth. The first frequency band is dictated by the first tuning temperature and the fixed input current. Further, a second tuning temperature is provided to a temperature dependent optical reflector configured to receive the light beam generated by the pump laser. The second tuning temperature is based on the target band of the pumping beam and causes the optical reflector to reflect light of the light beam that is within a second frequency band that corresponds to the target frequency band. The second frequency band reflected by the optical reflector is dictated by the second tuning temperature. The reflected light beam is emitted, as the pumping beam, by the optical pumping block into a transmission optical medium configured to carry an optical signal.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Optical networks may include nodes that may be configured to communicate information to each other via optical signals carried by optical fibers. The optical signals may be generated by modulating one or more beams of light with the information such that the beams of light operate as carrier waves (also referred to as "carriers") of the information. Any suitable modulation scheme may be used to encode the information including, any suitable polarization multiplexed or dual-polarization modulation scheme such as a dual-polarization (DP) modulation scheme that may include a dual-polarization quadrature phase-shift keying (DP-QPSK) modulation scheme, a DP-8PSK modulation scheme, a DP-16PSK modulation scheme, or any applicable dual-polarization quadrature amplitude modulation (DP-QAM) scheme (e.g., DP-QAM, DP-8QAM, DP-16QAM, etc.).

In addition, optical networks may transmit optical signals at specific wavelength ranges that are each associated with a particular channel. Each channel may be configured to carry a certain amount of information along optical fibers. To increase the information carrying capabilities of the optical networks, multiple signals transmitted at respective channels may be combined into a single multiplexed optical signal. The process of communicating information at multiple channels of a single multiplexed optical signal is referred to in optics as wavelength division multiplexing (WDM). Dense wavelength division multiplexing (DWDM) as used herein may refer to the multiplexing of a relatively larger (denser) number of wavelengths, usually greater than forty, into a fiber. WDM, DWDM, or other multi-wavelength transmission techniques are employed in optical networks to increase the aggregate bandwidth per optical fiber. With more bandwidth, optical networks are capable of transmitting relatively greater amounts of information. In the present disclosure, reference to "WDM transmission" or "WDM signals" may refer to any suitable multi-wavelength (or also referred to as multi-channel) based transmission or signal.

Further, optical pumping may be used to amplify optical signals that propagate within an optical network. However, some optical amplifiers that employ optical pumping may not be well suited for performing forward optical pumping in conjunction with passive Raman-based amplification with respect to WDM transmission. For example, some currently used pump lasers that are used for wide frequency spectrum pumping may have poor relative intensity noise (RIN) performance when applied to forward pumping schemes. In other instances, some pump lasers, such as Fabry-Perot pump lasers ("FP pumps"), may have relatively low RIN. However, the current and temperature dependence on their respective oscillation wavelengths and varying degrees of oscillation wavelength ranges that vary from FP pump to FP pump provide difficulties for using FP pumps for forward optical pumping. In the present disclosure, reference to the term "forward pumping" refers to pumping schemes in which the pumping beam propagates in the same direction as the signal being amplified.

According to one or more embodiments of the present disclosure, an optical amplifier may be configured to perform forward optical pumping for WDM transmission. In these or other embodiments, the optical amplifier may include a temperature and/or current dependent pump laser (e.g., an FP pump) that may be employed in a manner that reduces issues related to having both current and temperature dependence and/or that may reduce issues related to varying degrees of oscillation wavelength ranges by different pump lasers.

Embodiments of the present disclosure will be explained with reference to the accompanying drawings.

Figure 1:
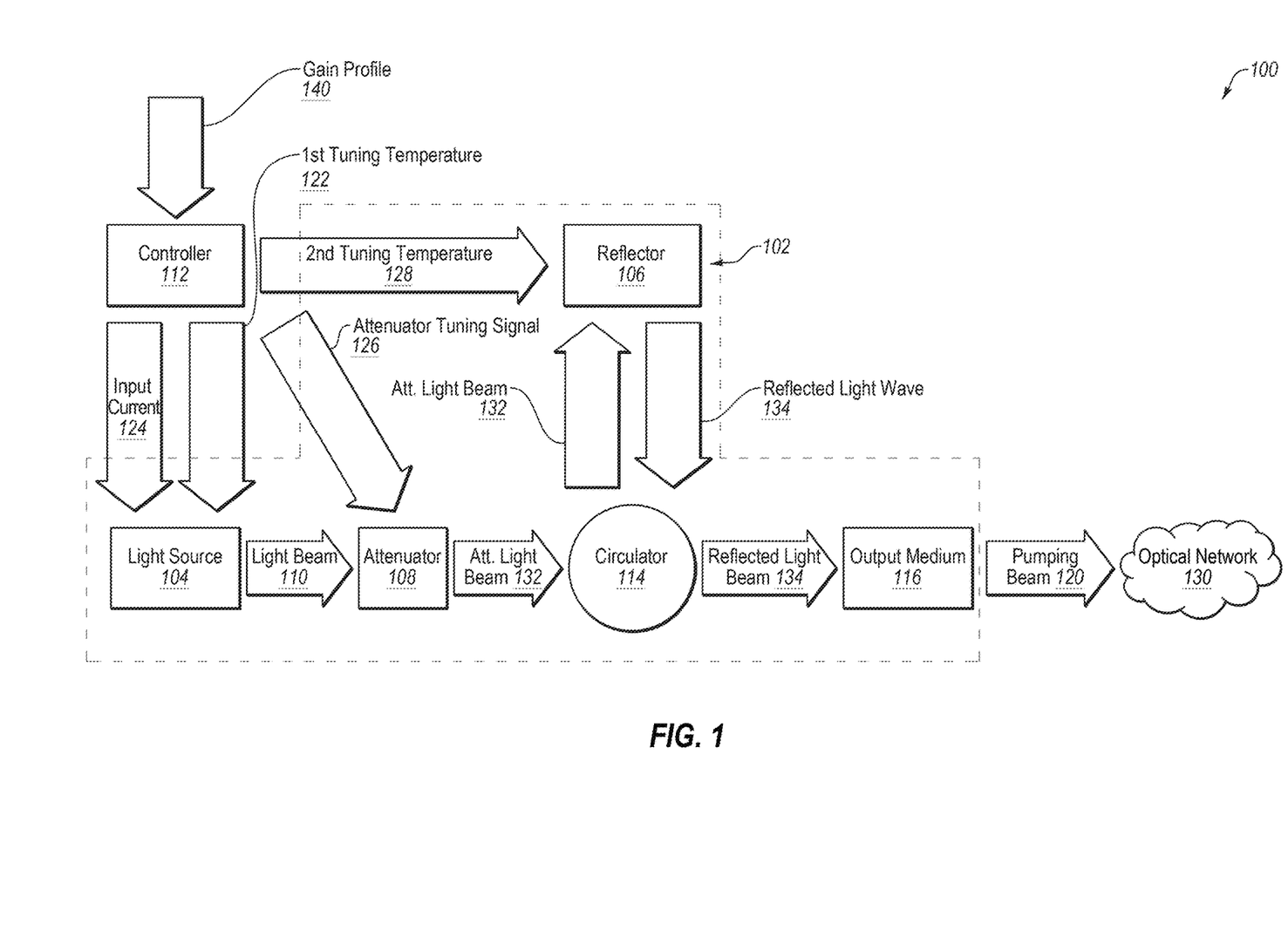
FIG. 1 illustrates an example embodiment of an optical system configured to perform pumping of optical signals.

FIG. 1 illustrates an example embodiment of an optical system 100 ("system 100") configured to perform pumping of optical signals. The system 100 may be configured according to any suitable embodiment of the present disclosure.

In general, the system 100 may include a pumping block 102 configured to generate a pumping beam 120 that may amplify an optical signal that may be propagating through an optical network 130. In some embodiments, one or more of the elements of the system 100 may be included in any suitable optical device. For example, one or more elements of the system 100 (e.g., the pumping block 102) may be included in any suitable optical amplifier configured to apply a gain to the optical signal. In some embodiments, the system 100 may include the pumping block 102, a controller 112, and the optical network 130.

The optical network 130 may be any suitable optical network including a point-to-point optical network with terminal nodes, a ring optical network, a mesh optical network, or any other suitable optical network or combination of optical networks. For example, the optical network 130 may include nodes that are configured to communicate information to each other via the optical signal transmitted through optical fibers.

The optical signal may be generated by modulating one or more beams of light with a data stream of information. Any suitable modulation scheme may be used to encode the information including any suitable polarization multiplexed or dual-polarization modulation scheme such as a dual-polarization (DP) modulation scheme that may include a dual-polarization quadrature phase-shift keying (DP-QPSK) modulation scheme, a DP-8PSK modulation scheme, a DP-16PSK modulation scheme, or any applicable dual-polarization quadrature amplitude modulation (DP-QAM) scheme (e.g., DP-QAM, DP-8QAM, DP-16QAM, etc.). As such, in some embodiments, the optical signal may include a dual-polarization optical signal. Further, the optical signal may be a WDM signal that includes multiple beams that each correspond to different wavelength bands (or "channels") and that each include information modulated thereon.

In some embodiments, the optical network 130 may include, as transmission media, one or more doped optical fibers that are configured to amplify light beams propagating therein. In these or other embodiments, the doped fibers may be such that different frequencies may be amplified differently. Therefore, light beams having different frequencies and propagating through the same doped fiber may have different levels of amplification applied thereto by the doped fiber.

In some embodiments, the pumping block 102 may include a light source 104, an optical reflector 106 ("reflector 106"), an optical attenuator 108 ("attenuator 108"), an optical circulator 114 ("circulator 114"), and an output medium 116. The pumping block 102 may be optically coupled to a transmission medium of the optical network 130 via the output medium 116. The coupling may be such that the pumping beam 120, which may be generated by the pumping block 102, may be injected into the transmission medium as a forward pumped pumping beam that propagates in substantially the same direction as the optical signals propagating in the transmission medium. As indicated above, the pumping block 102 may be configured to generate the pumping beam 120, which may be configured to amplify optical signals propagating in the optical network 130.

The light source 104 may be configured to generate a light beam 110 that may be processed as indicated below to generate the pumping beam 120. The light source 104 may include a pump laser configured to generate the light beam 110. Further, the light source 104 may be configured generate the light beam 110 as a continuous wave light beam. Additionally or alternatively, the light source 104 may be configured to generate the light beam 110 such that the light beam 110 has a particular frequency range. In these or other embodiments, the light source 104 may be temperature and/or current dependent such that the center of the particular frequency range may vary depending on an input current of the light source 104 and/or a temperature of the light source 104. For example, in some embodiments, the light source 104 may be a Fabry-Perot laser pump ("FP pump") that may be temperature and current dependent such that the center frequency of the light beam 110 may vary based on temperature and current.

Further, in some embodiments due to differences that may occur during manufacturing, the light source 104 may be such that the size of the frequency band and/or the center frequency of the light beam 110 generated by the light source 104 may vary as compared to other light sources of the same type, even when tuned in substantially the same manner. For example, the frequency band and/or center frequency between two different FP pumps that are tuned using the same tuning temperature and provided the same current may have variations in frequency bands and/or center frequencies due to physical differences between the two FP pumps that may occur during manufacturing.

The controller 112 may include code and routines configured to enable a computing system to perform one or more operations related to controlling a frequency of the light source 104 and/or of the reflector 106 of the system 100. Additionally or alternatively, the controller 112 may be implemented using hardware including a processor, a microprocessor (e.g., to perform or control performance of one or more operations), a field-programmable gate array (FPGA), or an application-specific integrated circuit (ASIC). In some other instances, the controller 112 may be implemented using a combination of hardware and software. In the present disclosure, operations described as being performed by the controller 112 may include operations that the controller 112 may direct a corresponding system to perform.

In some embodiments, the controller 112 may be configured to cause an input current 124 to be provided to the light source 104. In these or other embodiments, the controller 112 may cause that the input current 124 is set to a particular level and unchanged to help account for the current dependency of the light source 104. For example, in some embodiments, the input current 124 may be fixed at a maximum current of the light source 104 to help account for the current dependency of the light source 104. In the present disclosure reference to a "fixed input current" indicates that an input current is set and not changed over a particular amount of time but does not imply that the input current is unable to be changed.

In these or other embodiments, the controller 112 may be configured to cause a first tuning temperature 122 to be provided at the light source 104. The first tuning temperature 122 may be a temperature that corresponds to a target frequency band ("target band") of the light beam 110. The target band may have a target center frequency and a corresponding target bandwidth. In these or other embodiments, the target band may correspond to a particular band of a WDM signal.

For example, the first tuning temperature 122 may be a temperature that causes the light source 104 to generate the light beam 110 to have a first frequency band that has a first center frequency that is the same as or approximately the same as the target center frequency in instances in which the input current is at the fixed level (e.g., in instances in which the input current is set to maximum). In these or other embodiments, the light beam 110 may have a first bandwidth that is substantially centered at the first center frequency. The first bandwidth may correspond to the target bandwidth. As indicated above, the actual values of the first bandwidth and/or the first center frequency may vary from the target bandwidth and/or the target center frequency depending on varying physical characteristics of the light source 104 that are produced during manufacturing of the light source 104.

In some embodiments, the system 100 may include the attenuator 108. The attenuator 108 may include any suitable system or device configured to attenuate optical waves. In some embodiments, the attenuator 108 may be configured to apply a particular amount of attenuation to the light beam 110 to produce an attenuated light beam 132. In these or other embodiments, the attenuator 108 may be tunable such that the amount of attenuation may be according to an attenuator tuning signal 126. Additionally or alternatively, the controller 112 may be configured to cause the attenuator tuning signal 126 to be provided to the attenuator 108. In these or other embodiments, the attenuator tuning signal 126 may be such that the amount of attenuation is according to a target amount of attenuation. Additionally or alternatively, the attenuator tuning signal 126 may include any suitable input or stimulus that may be applied to the attenuator 108 to tune the attenuator to the target amount of attenuation. In these or other embodiments, the attenuation of the attenuator 108 may be specified according to the target frequency band of the light beam 110.

In some embodiments, the target amount of attenuation may be based on a target power level of the pumping beam 120. In these or other embodiments, the target power level of the pumping beam 120 may be based on an amount of amplification that may be passively applied by the transmission medium of the optical network 130 to light beams having a center frequency substantially similar to the target center frequency of the pumping beam 120. For example, as indicated above, certain frequencies may be amplified differently by doped fibers such that the target power level of the pumping beam 120 may be adjusted according to a target total gain (e.g., the gain applied by the pumping beam 120 and by the doped transmission medium) of optical signals having corresponding bandwidths as the pumping beam 120 and propagating through the doped transmission medium.

The circulator 114 may be configured to receive the attenuated light beam 132 in some embodiments. The circulator 114 may include any suitable system, apparatus, or device configured to receive the attenuated light beam 132 and configured to direct the attenuated light beam 132 toward the reflector 106.

The reflector 106 may include any suitable system, apparatus, or device configured to reflect the attenuated light beam 132 to produce a reflected light beam 134. In these or other embodiments, the reflector 106 may be configured to reflect light beams that are within the target band and to let beams that are outside of the target band to pass through it (also referred to as "transmitting" the beams that are outside of the target beam). In these or other embodiments, the reflector 106 may be tunable such that the reflection frequency band may be changed. Additionally or alternatively, as compared to the pump laser of the light source 104, the reflector 106 may be selected such that variations in the actual reflection frequency band from reflector to reflector may be relatively small or effectively non-existent. As such, the tuning of the reflector 106 may be more precise than the tuning of the light source 104.

In these or other embodiments, the reflector 106 may be tuned based on a second tuning temperature 128. The second tuning temperature 128 may be based on the target band and a temperature of the reflector 106 that causes the reflection frequency band to be substantially similar to the target band. In some embodiments, the controller 112 may be configured to cause the second tuning temperature 128 to be provided to the reflector 106. In some embodiments, the reflector 106 may be a Fiber Bragg grating reflector that uses Fiber Bragg grating to reflect light beams that are within the tuned frequency band, as dictated by the second tuning temperature.

The tuning of the reflector 106 based on the target band may be such that the reflected light beam 134 may be within a second frequency band that corresponds to the target band. Further, due to the more precise nature the reflector 106 as compared to the light source 104, the second frequency band may be closer to the target band than the first frequency band. As such, the reflector 106 may cause that the reflected light beam 134 is closer to the target band than light beam 110 generated by the light source 104. Accordingly, the reflector 106 may allow for more precise tuning of the pumping wave 120, which, as discussed below, may be the reflected light beam 134.

The reflector 106 may reflect the reflected light beam 134 back towards the circulator 114. The circulator 114 may be configured to direct the reflected light beam towards an output medium 116.

The output medium 116 may include any suitable optical media that may be used to direct the received reflected light beam 134 into a transmission medium of the optical network 130 such that the reflected light beam 134 may operate as the pumping wave 120 in the optical network 130. For example, the output medium 116 may include an optical fiber and/or an optical fiber coupling that connects to the transmission medium.

In some embodiments, a gain profile 140 of the pumping wave 120 may be obtained by the controller 112. The gain profile 140 may provide an indication of the power and frequency band of the pumping beam 120. In some embodiments, the controller 112 may be configured to compare the gain profile 140 against the target band and target power levels of the pumping beam 120. In these or other embodiments, the controller 112 may be configured to adjust one or more of the first tuning temperature, the second tuning temperature, or the attenuator tuning signal 126 based on the comparison. The adjustment may be to help bring the frequency band and/or the power of the pumping beam 120 closer to the target band and/or the target power. In some embodiments, the controller 112 may be configured to iteratively obtain the gain profile 140 and make one or more adjustments until the gain profile 140 indicates that the power and/or frequency band of the pumping beam 120 are within a threshold of the target power and/or target band.

Modifications, additions, or omissions may be made to FIG. 1 without departing from the scope of the present disclosure. For example, the system 100 may include more elements than those explicitly illustrated and/or described. Additionally, the different elements of the system 100 may be organized into a same device or two or more different devices. In these or other embodiments, the elements of the system 100 may be configured differently depending on the application.

Figure 2:
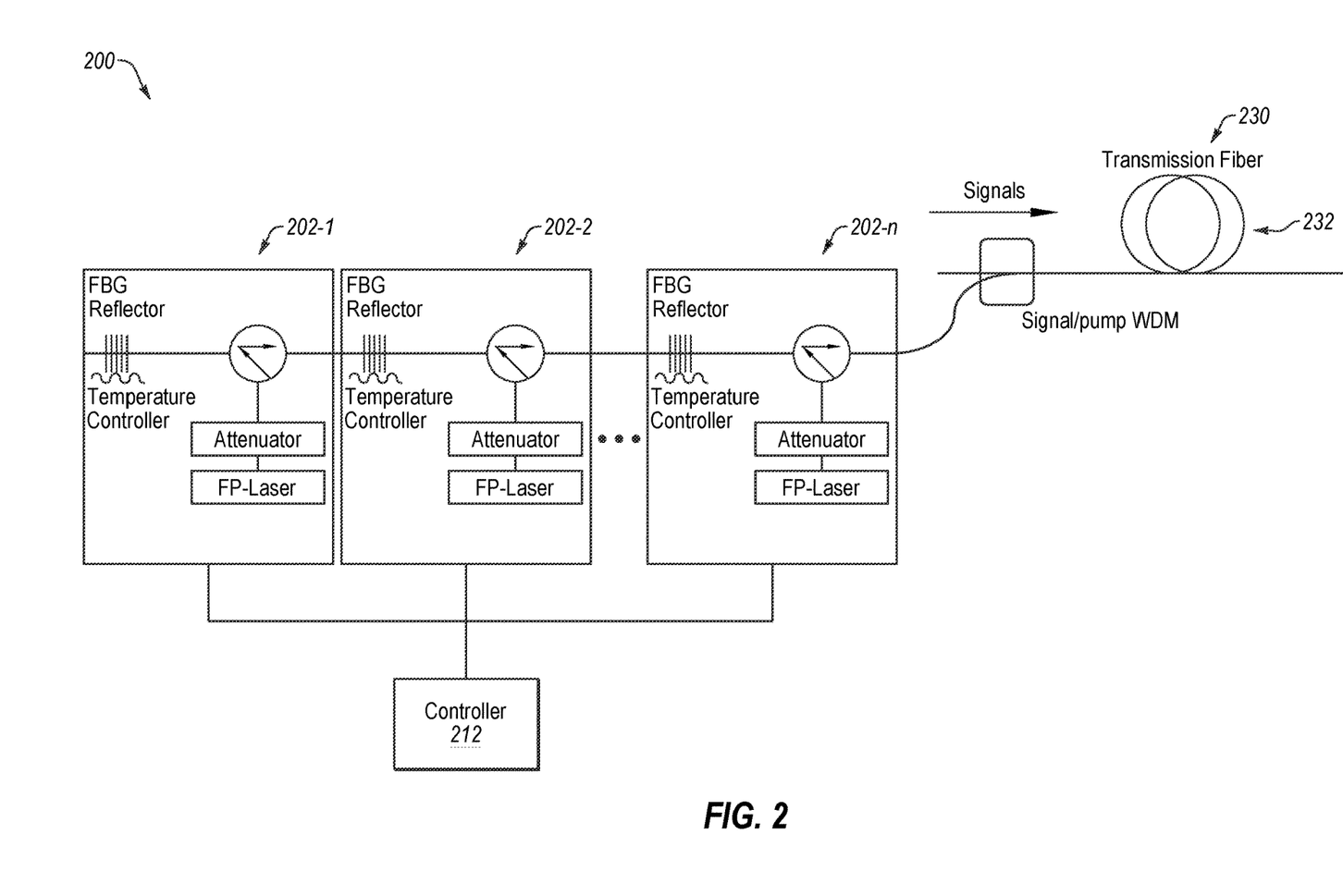
FIG. 2 illustrates an example embodiment of an optical system configured to perform forward pumping of WDM signals.

For example, FIG. 2 illustrates an example system 200 that utilizes elements of the system 100 in the context of providing forward pumping of WDM signals, according to one or more embodiments of the present disclosure. The system 200 may include pumping blocks 202-1-202n, a controller 212, and an optical network 230. Each of the pumping blocks 202 may be analogous to the pumping block 102 of FIG. 1. In the illustrated example, the light sources of the pumping blocks 202 may include FP pump lasers ("FP-Laser") and the reflectors may include Fiber Bragg Grating (FBG) reflectors The controller 212 may be analogous to the controller 112 of FIG. 1, and the network 230 may be analogous to the network 130 of FIG. 1.

In general, the pumping blocks 202 and the controller 212 may be configured to generate a WDM pumping beam that is emitted into a transmission fiber 232 of the optical network 230. In some embodiments, the transmission fiber 232 may be a doped transmission fiber. Additionally or alternatively, WDM signals may propagate through the transmission fiber 232. The WDM pumping beam may be configured to amplify the WDM signals that are propagating through the transmission fiber 232. The pumping blocks 202 may be configured to generate the emitted WDM pumping beam as follows below.

Each pumping block 202 may correspond to a respective channel of the WDM signals propagating in the transmission medium 230. As such, the number of pumping blocks 202 may correspond to the number of channels of the WDM signals.

In these or other embodiments, the controller 212 may be configured to tune each respective pumping block 202 (such as described above) according to a target band that is the same as the frequency band as the channel to which the respective pumping block 202 corresponds. Therefore, each pumping block 202 may output a channel pumping beam that may amplify the corresponding channel of the WDM signals.

Additionally or alternatively, the controller 212 may also adjust the power of the different channel pumping beams of the respective pumping blocks 202 (e.g., by adjusting the respective attenuators of the respective pumping blocks 202) according to the frequency response of the transmission fiber 232 with respect to the different channels of the WDM signals.

For example, in instances in which the transmission fiber 232 is a doped fiber, the transmission fiber 232 may amplify light waves that correspond to a first channel more than light waves that correspond to a second channel. In these or other embodiments, to compensate for such a difference, the controller 212 may adjust a first attenuator of a first pumping block 202-1 that corresponds to the first channel and may adjust a second attenuator of a second pumping block 202-2 that corresponds to the second channel such that a second channel pumping beam produced by the second pumping block 202-2 has more power than a first channel pumping beam produced by the first pumping block 202-1. Analogous types of adjustments may be made in instances in which loss within the transmission fiber differs between different channels.

As illustrated in FIG. 2, in some embodiments, the pumping blocks 202 may be arranged in series with each other such that the channel pumping beam of one pumping block may be sent to the reflector of another pumping block. As described above, each reflector of each pumping block 202 may be tuned to reflect beams that are within its respective target band and to transmit beams that are outside of its respective target band. The channel pumping beam of one pumping block 202 is outside of the target band of another pumping block 202. Therefore, the channel pumping beams of the other pumping blocks 202 pass through the respective reflector of any given other pumping block 202 to be combined with the reflected beam of the other pumping block 202. Such arrangement therefore combines the individual channel pumping beams into the WDM pumping beam.

Modifications, additions, or omissions may be made to FIG. 2 without departing from the scope of the present disclosure. For example, the number of controllers 212 that may control the tuning of the pumping blocks 202 may vary. Further, the number of pumping blocks 202 may vary depending on particular applications.

Figure 3:
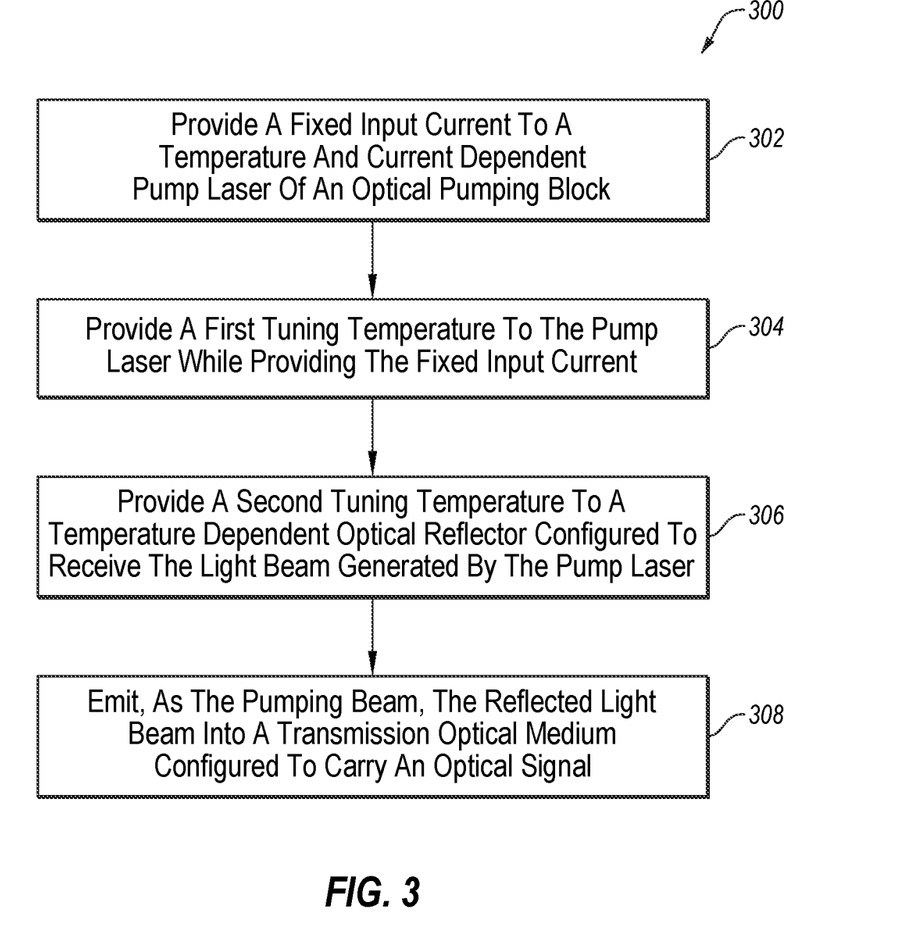
FIG. 3 is a flow chart of an example method of performing optical pumping.

FIG. 3 is a flow chart of an example method 300 of performing optical pumping, arranged in accordance with at least some embodiments of the present disclosure. The method 300 may be implemented by any suitable element of an optical pumping system such as the systems 100 or 200 of FIGS. 1 and 2 described above. Although illustrated as discrete steps, various steps of the method 300 may be divided into additional steps, combined into fewer steps, or eliminated, depending on the desired implementation. Additionally, the order of performance of the different steps may vary depending on the desired implementation.

The method 300 may include a block 302, at which a fixed input current may be provided to a temperature and current dependent pump laser of an optical pumping block. For example, a maximum input current may be provided to the pump laser, which may be an FP pump laser in some embodiments.

At block 304, a first tuning temperature may be provided to the pump laser while the fixed input current is provided to the pump laser. The first tuning temperature may be based on a target band of a pumping beam, such as described above. The first tuning temperature may cause the pump laser to generate a light beam having a first frequency band that includes a first center frequency and a first bandwidth in which the first frequency band is dictated by the first tuning temperature and the fixed input current.

At block 306, a second tuning temperature may be provided to a temperature dependent optical reflector configured to receive the light beam generated by the pump laser. The second tuning temperature may be based on the target band of the pumping beam such as described above. The second tuning temperature may cause the optical reflector to reflect light of the light beam that is within a second frequency band. The second frequency band corresponds to the target frequency band and the second frequency band reflected by the optical reflector is dictated by the second tuning temperature. In some embodiments, the reflector may be a Fiber Bragg grating reflector.

At block 308, the reflected light beam may be emitted, as the pumping beam, into a transmission optical medium configured to carry an optical signal.

Modifications, additions, or omissions may be made to the method 300 without departing from the scope of the present disclosure. For example, the outlined steps and operations are only provided as examples, and some of the steps and operations may be optional, combined into fewer steps and operations, or expanded into additional steps and operations without detracting from the essence of the disclosed embodiments.

For instance, in some embodiments, the operations may include adjusting an attenuator of the optical pumping block such that the attenuator attenuates the light beam according to a target power level of the pumping beam. In these or other embodiments, the target power level may be based on an amplification amount or a loss amount of the transmission optical medium that corresponds to the target band.

In these or other embodiments, the operations may include obtaining a gain profile of the pumping beam and adjusting one or more of the first tuning temperature or the second tuning temperature based on the gain profile.

Further, in some embodiments, one or more of the operations performed by the elements of the pumping blocks 102 and/or 202 of FIGS. 1 and 2, such as described above, may be included in the method 300 in some embodiments.

Figure 4:
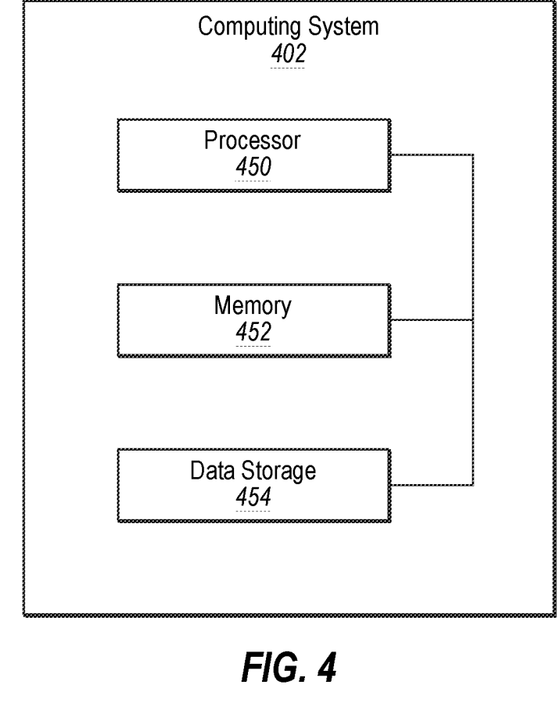
FIG. 4 illustrates a block diagram of an example computing system, all arranged in accordance with some embodiments of the present disclosure.

FIG. 4 illustrates a block diagram of an example computing system 402, according to at least one embodiment of the present disclosure. The computing system 402 may be configured to implement or direct one or more suitable operations described in the present disclosure. Additionally or alternatively, the computing system 402 may be included in the controller 112 of FIG. 1 and/or the controller 212 of FIG. 2. The computing system 402 may include a processor 450, a memory 452, and a data storage 454. The processor 450, the memory 452, and the data storage 454 may be communicatively coupled.

In general, the processor 450 may include any suitable special-purpose or general-purpose computer, computing entity, or processing device including various computer hardware or software modules and may be configured to execute instructions stored on any applicable computer-readable storage media. For example, the processor 450 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 4, the processor 450 may include any number of processors configured to, individually or collectively, perform or direct performance of any number of operations described in the present disclosure. Additionally, one or more of the processors may be present on one or more different electronic devices, such as different servers.

In some embodiments, the processor 450 may be configured to interpret and/or execute program instructions and/or process data stored in the memory 452, the data storage 454, or the memory 452 and the data storage 454. In some embodiments, the processor 450 may fetch program instructions from the data storage 454 and load the program instructions in the memory 452. After the program instructions are loaded into memory 452, the processor 450 may execute the program instructions.

The memory 452 and the data storage 454 may include computer-readable storage media for carrying or having computer-executable instructions or data structures stored thereon. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other non-transitory storage medium which may be used to carry or store particular program code in the form of computer-executable instructions or data structures and which may be accessed by a general-purpose or special-purpose computer. In these and other embodiments, the term "non-transitory" as explained in the present disclosure should be construed to exclude only those types of transitory media that were found to fall outside the scope of patentable subject matter in the Federal Circuit decision of In re Nuijten, 500 F.3d 1346 (Fed. Cir. 2007).

Combinations of the above may also be included within the scope of computer-readable storage media. Computer-executable instructions may include, for example, instructions and data configured to cause the processor 450 to perform a certain operation or group of operations.

Modifications, additions, or omissions may be made to the computing system 402 without departing from the scope of the present disclosure. For example, in some embodiments, the computing system 402 may include any number of other components that may not be explicitly illustrated or described.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. An optical system comprising:
   a temperature and current dependent pump laser configured to:
      receive a fixed input current such that the fixed input current is maintained to have a same value during operation of the pump laser, the fixed input current being based on a maximum current of the pump laser;
      receive a first tuning temperature while receiving the fixed input current, the first tuning temperature being based on a target band of a pumping beam; and
      generate a light beam having a first frequency band that includes a first center frequency and a first bandwidth in which the first frequency band is dictated by the first tuning temperature and the fixed input current;
   a temperature dependent optical reflector configured to:
      receive the light beam generated by the pump laser;
      receive a second tuning temperature that is based on the target band of the pumping beam; and
      produce a reflected light beam by reflecting light of the light beam that is within a second frequency band that corresponds to the target band in which the second frequency band reflected by the optical reflector is dictated by the second tuning temperature; and
   an output optical medium configured to receive the reflected light beam and emit, as the pumping beam, the reflected light beam in a transmission optical medium configured to carry an optical signal.

2. The optical system of claim 1, further comprising an optical circulator configured to:
   receive the light beam generated by the pump laser;
   direct the light beam toward the optical reflector;
   receive the reflected light beam reflected by the optical reflector; and
   direct the reflected light beam to the output optical medium.

3. The optical system of claim 1, further comprising an attenuator configured to:
   receive the light beam generated by the pump laser prior to the light beam being reflected by the optical reflector; and
   attenuate the light beam according to a target power level of the pumping beam.

4. The optical system of claim 3, wherein the target power level is based on an amplification amount of the transmission optical medium that corresponds to the target band.

5. The optical system of claim 1, wherein the target band corresponds to a particular band of a wavelength division multiplexed (WDM) signal.

6. The optical system of claim 1, wherein the pump laser is a Fabry-Perot pump laser and wherein the optical reflector is a Fiber Bragg grating reflector.

7. The optical system of claim 1, further comprising a control system configured to:
   determine one or more of the first tuning temperature or the second tuning temperature; and
   cause the receiving of one or more of the first tuning temperature or the second tuning temperature.

8. The optical system of claim 7, wherein the control system is further configured to:
   obtain a gain profile of the pumping beam; and
   adjust one or more of the first tuning temperature and the second tuning temperature based on the gain profile.

9. A computing system comprising:
   one or more processors; and
   one or more computer-readable storage media configured to store instructions that, in response to being executed by the one or more processors, cause the system to perform operations, the operations comprising:
      providing a fixed input current to a temperature and current dependent pump laser of an optical pumping block, the fixed input current corresponding to a maximum current of the pump laser;
      providing a first tuning temperature to the pump laser while providing the fixed input current, the first tuning temperature being based on a target band of a pumping beam and the first tuning temperature causing the pump laser to generate a light beam having a first frequency band that includes a first center frequency and a first bandwidth in which the first frequency band is dictated by the first tuning temperature and the fixed input current; and
      providing a second tuning temperature to a temperature dependent optical reflector configured to receive the light beam generated by the pump laser, the second tuning temperature being based on the target band of the pumping beam and the second tuning temperature causing the optical reflector to reflect light of the light beam that is within a second frequency band that corresponds to the target band in which the second frequency band reflected by the optical reflector is dictated by the second tuning temperature, wherein the reflected light beam is emitted, as the pumping beam, by the optical pumping block into a transmission optical medium configured to carry an optical signal.

10. The system of claim 9, wherein the operations further comprise adjusting an attenuator of the optical pumping block such that the attenuator attenuates the light beam according to a target power level of the pumping beam.

11. The system of claim 10, wherein the target power level is based on an amplification amount of the transmission optical medium that corresponds to the target band.

12. The system of claim 9, wherein the system further comprises the optical pumping block.

13. The system of claim 10, wherein the operations further comprise:
   obtaining a gain profile of the pumping beam; and
   adjusting one or more of the first tuning temperature and the second tuning temperature based on the gain profile.

14. The system of claim 10, wherein the pump laser is a Fabry-Perot pump laser and wherein the optical reflector is a Fiber Bragg grating reflector.

15. A method comprising:
providing a fixed input current to a temperature and current dependent pump laser of an optical pumping block, the fixed input current being maintained during active operation of the pump laser;
providing a first tuning temperature to the pump laser while providing the fixed input current, the first tuning temperature being based on a target band of a pumping beam and the first tuning temperature causing the pump laser to generate a light beam having a first frequency band that includes a first center frequency and a first bandwidth in which the first frequency band is dictated by the first tuning temperature and the fixed input current;
providing a second tuning temperature to a temperature dependent optical reflector configured to receive the light beam generated by the pump laser, the second tuning temperature being based on the target band of the pumping beam and the second tuning temperature causing the optical reflector to reflect light of the light beam that is within a second frequency band that corresponds to the target band in which the second frequency band reflected by the optical reflector is dictated by the second tuning temperature; and
emitting, as the pumping beam, the reflected light beam into a transmission optical medium configured to carry an optical signal.

16. The method of claim 15, further comprising adjusting an attenuator of the optical pumping block such that the attenuator attenuates the light beam according to a target power level of the pumping beam.

17. The method of claim 16, wherein the target power level is based on an amplification amount or a loss of the transmission optical medium that corresponds to the target band.

18. The method of claim 15, further comprising:
obtaining a gain profile of the pumping beam; and
adjusting one or more of the first tuning temperature and the second tuning temperature based on the gain profile.

19. The method of claim 15, wherein the pump laser is a Fabry-Perot pump laser and wherein the optical reflector is a Fiber Bragg grating reflector.

20. The method of claim 15, wherein the pumping beam is combined with one or more other pumping beams.

* * * * *